(12) United States Patent
Zhao

(10) Patent No.: US 12,404,184 B2
(45) Date of Patent: Sep. 2, 2025

(54) METHOD FOR CONTINUOUS GROWTH OF WATER-SOLUBLE MAGNETIC NANOMATERIALS

(71) Applicant: Jackson State University, Jackson, MS (US)

(72) Inventor: Yongfeng Zhao, Edwardsville, IL (US)

(73) Assignee: Jackson State University, Jackson, MS (US)

( * ) Notice: Subject to any disclaimer, the term of this patent is extended or adjusted under 35 U.S.C. 154(b) by 94 days.

(21) Appl. No.: 16/795,414

(22) Filed: Feb. 19, 2020

(65) Prior Publication Data
US 2020/0262715 A1   Aug. 20, 2020

Related U.S. Application Data

(60) Provisional application No. 62/807,407, filed on Feb. 19, 2019.

(51) Int. Cl.
*C01G 49/08* (2006.01)
*B82Y 40/00* (2011.01)
(Continued)

(52) U.S. Cl.
CPC ......... *C01G 49/08* (2013.01); *C01G 49/0072* (2013.01); *H01F 1/36* (2013.01); *B82Y 25/00* (2013.01); *B82Y 40/00* (2013.01); *C01P 2002/72* (2013.01); *C01P 2002/82* (2013.01); *C01P 2002/88* (2013.01);
(Continued)

(58) Field of Classification Search
CPC .... C01G 49/08; C01G 49/0072; C01G 45/02; C01G 51/04; C01G 53/04; C01G 1/02; H01F 1/36; H01F 1/0054; B82Y 25/00; B82Y 40/00; C01P 2002/72; C01P 2002/82; C01P 2002/88; C01P 2004/04;
(Continued)

(56) References Cited

FOREIGN PATENT DOCUMENTS

WO   2006052042 A1   5/2006

OTHER PUBLICATIONS

Sun, Shouheng, et al. "Monodisperse mfe2O4 (m=fe, co, mn) nanoparticles." Journal of the American chemical society 126.1 (2004): 273-279.*

(Continued)

*Primary Examiner* — Richard M Rump
(74) *Attorney, Agent, or Firm* — Butler Snow LLP

(57) ABSTRACT

Embodiments of a method for synthesizing water-soluble metal oxide nanoparticles are disclosed. In one embodiment, the method includes heating a first reaction mixture at a predetermined temperature for a predetermined time duration with continuous stirring to obtain a second reaction mixture that comprises water-soluble metal oxide nanoparticles of a first size. The first reaction mixture includes a reactant and a polyol. The method further includes adding a first predetermined amount of the reactant to the second reaction mixture to obtain a third reaction mixture. The method further includes heating the third reaction mixture at the predetermined temperature for the predetermined time duration with continuous stirring to obtain a fourth reaction mixture comprising water-soluble metal oxide nanoparticles of a second size. The reactant is $Fe(acac)_3$ and the polyol is diethylene glycol (DEG) for synthesizing water-soluble iron oxide nanoparticles.

20 Claims, 10 Drawing Sheets

(51) Int. Cl.
   *C01G 49/00* (2006.01)
   *H01F 1/36* (2006.01)
   *B82Y 25/00* (2011.01)
(52) U.S. Cl.
   CPC ...... *C01P 2004/04* (2013.01); *C01P 2004/64* (2013.01); *C01P 2006/42* (2013.01)
(58) Field of Classification Search
   CPC .............. C01P 2004/64; C01P 2006/42; C01P 2004/51; C01P 2006/22
   See application file for complete search history.

(56) References Cited

OTHER PUBLICATIONS

Cai, Wei, and Jiaqi Wan. "Facile synthesis of superparamagnetic magnetite nanoparticles in liquid polyols." Journal of colloid and interface science 305.2 (2007): 366-370.*
Hyeon, Taeghwan, et al. "Synthesis of highly crystalline and monodisperse maghemite nanocrystallites without a size-selection process." Journal of the American Chemical Society 123.51 (2001): 12798-12801.*
Miguel-Sancho, Nuria, et al. "Synthesis of magnetic nanocrystals by thermal decomposition in glycol media: effect of process variables and mechanistic study." Industrial & engineering chemistry research 51.25 (2012): 8348-8357.*
Günay, Merva, Abdülhadi Baykal, and Hüseyin Sözeri. "Structural and magnetic properties of triethylene glycol stabilized monodisperse Fe 3 O 4 nanoparticles." Journal of superconductivity and novel magnetism 25.7 (2012): 2415-2420.*
Jiao, Mingxia, et al. "Flow synthesis of biocompatible Fe3O4 nanoparticles: insight into the effects of residence time, fluid velocity, and tube reactor dimension on particle size distribution." Chemistry of Materials 27.4 (2015): 1299-1305.*
Park, Sangmin. "Synthesis and characterization of size-controlled FeCo nanoparticles and composites with graphene." (2018).*
Hu, Fengqin, et al. "Ultrasmall, water-soluble magnetite nanoparticles with high relaxivity for magnetic resonance imaging." The Journal of Physical Chemistry C 113.49 (2009): 20855-20860.*
Li, X., Iocozzia, J., Chen, Y., Zhao, S., Cui, X., Wang, W., . . . & Lin, Z. (2018). Functional nanoparticles enabled by block copolymer templates: from precision synthesis of block copolymers to properties and applications of nanoparticles. Angew. Chem., Int. Ed, 57, 2046-2070.
Laurent, S., Forge, D., Port, M., Roch, A., Robic, C., Vander Elst, L., & Muller, R. N. (2008). Magnetic iron oxide nanoparticles: synthesis, stabilization, vectorization, physicochemical characterizations, and biological applications. Chemical reviews, 108(6), 2064-2110.
Bao, Y., Sherwood, J. A., & Sun, Z. (2018). Magnetic iron oxide nanoparticles as T 1 contrast agents for magnetic resonance imaging. Journal of Materials Chemistry C, 6(6), 1280-1290.
Lee, N., Yoo, D., Ling, D., Cho, M. H., Hyeon, T., & Cheon, J. (2015). Iron oxide based nanoparticles for multimodal imaging and magnetoresponsive therapy. Chemical reviews, 115(19), 10637-10689.
Qiao, R., Yang, C., & Gao, M. (2009). Superparamagnetic iron oxide nanoparticles: from preparations to in vivo MRI applications. Journal of Materials Chemistry, 19(35), 6274-6293.
Tong, S., Quinto, C. A., Zhang, L., Mohindra, P., & Bao, G. (2017). Size-dependent heating of magnetic iron oxide nanoparticles. ACS nano, 11(7), 6808-6816.
Lee, J. H., Huh, Y. M., Jun, Y. W., Seo, J. W., Jang, J. T., Song, H. T., . . . & Cheon, J. (2007). Artificially engineered magnetic nanoparticles for ultra-sensitive molecular imaging. Nature medicine, 13(1), 95-99.
Kim, B. H., Lee, N., Kim, H., An, K., Park, Y. I., Choi, Y., . . . & Hyeon, T. (2011). Large-scale synthesis of uniform and extremely small-sized iron oxide nanoparticles for high-resolution T 1 magnetic resonance imaging contrast agents. Journal of the American Chemical Society, 133(32), 12624-12631.
Wei, H., Bruns, O. T., Kaul, M. G., Hansen, E. C., Barch, M., Wiśniowska, A., . . . & Bawendi, M. G. (2017). Exceedingly small iron oxide nanoparticles as positive MRI contrast agents. Proceedings of the national academy of sciences, 114 (9), 2325-2330.
Park, J., Lee, E., Hwang, N. M., Kang, M., Kim, S. C., Hwang, Y., . . . & Hyeon, T. (2005). One-Nanometer-Scale Size-Controlled Synthesis of Monodisperse Magnetic Iron Oxide Nanoparticles. Angewandte Chemie International Edition, 44(19), 2872-2877.
Sun, S., & Zeng, H. (2002). Size-controlled synthesis of magnetite nanoparticles. Journal of the American Chemical Society, 124(28), 8204-8205.
Park, J., An, K., Hwang, Y., Park, J. G., Noh, H. J., Kim, J. Y., . . . & Hyeon, T. (2004). Ultra-large-scale syntheses of monodisperse nanocrystals. Nature materials, 3(12), 891-895.
Sun, S., Zeng, H., Robinson, D. B., Raoux, S., Rice, P. M., Wang, S. X., & Li, G. (2004). Monodisperse mfe2o4 (m=fe, co, mn) nanoparticles. Journal of the American chemical society, 126(1), 273-279.
Vreeland, E. C., Watt, J., Schober, G. B., Hance, B. G., Austin, M. J., Price, A. D., . . . & Huber, D. L. (2015). Enhanced nanoparticle size control by extending LaMer's mechanism. Chemistry of Materials, 27(17), 6059-6066.
Cooper, S. R., Plummer, L. K., Cosby, A. G., Lenox, P., Jander, A., Dhagat, P., & Hutchison, J. E. (2018). Insights into the magnetic properties of sub-10 nm iron oxide nanocrystals through the use of a continuous growth synthesis. Chemistry of Materials, 30(17), 6053-6062.
Jansons, A. W., Plummer, L. K., & Hutchison, J. E. (2017). Living Nanocrystals. Chemistry of Materials, 29(13), 5415-5425.
Liong, M., Shao, H., Haun, J. B., Lee, H., & Weissleder, R. (2010). Carboxymethylated polyvinyl alcohol stabilizes doped ferrofluids for biological applications. Advanced materials, 22(45), 5168-5172.
Xu, C., Xu, K., Gu, H., Zheng, R., Liu, H., Zhang, X., . . . & Xu, B. (2004). Dopamine as a robust anchor to immobilize functional molecules on the iron oxide shell of magnetic nanoparticles. Journal of the American Chemical Society, 126 (32), 9938-9939.
Amstad, E., Gillich, T., Bilecka, I., Textor, M., & Reimhult, E. (2009). Ultrastable iron oxide nanoparticle colloidal suspensions using dispersants with catechol-derived anchor groups. Nano letters, 9(12), 4042-4048.
Wang, W., Ji, X., Na, H. B., Safi, M., Smith, A., Palui, G., . . . & Mattoussi, H. (2014). Design of a multi-dopamine-modified polymer ligand optimally suited for interfacing magnetic nanoparticles with biological systems. Langmuir, 30 (21), 6197-6208.
Wei, H., Insin, N., Lee, J., Han, H. S., Cordero, J. M., Liu, W., & Bawendi, M. G. (2012). Compact zwitterion-coated iron oxide nanoparticles for biological applications. Nano letters, 12(1), 22-25.
Zhang, T., Ge, J., Hu, Y., & Yin, Y. (2007). A general approach for transferring hydrophobic nanocrystals into water. Nano letters, 7(10), 3203-3207.
Xu, Y., Qin, Y., Palchoudhury, S., & Bao, Y. (2011). Water-soluble iron oxide nanoparticles with high stability and selective surface functionality. Langmuir, 27(14), 8990-8997.
Roca, A. G., Veintemillas-Verdaguer, S., Port, M., Robic, C., Serna, C. J., & Morales, M. P. (2009). Effect of nanoparticle and aggregate size on the relaxometric properties of MR contrast agents based on high quality magnetite nanoparticles. The Journal of Physical Chemistry B, 113(19), 7033-7039.
Feldmann, C., & Jungk, H. O. (2001). Polyol-mediated preparation of nanoscale oxide particles. Angewandte Chemie International Edition, 40(2), 359-362.
Cai, W., & Wan, J. (2007). Facile synthesis of superparamagnetic magnetite nanoparticles in liquid polyols. Journal of colloid and interface science, 305(2), 366-370.
Liu, J., Sun, Z., Deng, Y., Zou, Y., Li, C., Guo, X., . . . & Zhao, D. (2009). Highly water-dispersible biocompatible magnetite particles with low cytotoxicity stabilized by citrate groups. Angewandte Chemie International Edition, 48(32), 5875-5879.
Ge, J., Hu, Y., Biasini, M., Beyermann, W. P., & Yin, Y. (2007). Superparamagnetic magnetite colloidal nanocrystal clusters. Angewandte Chemie International Edition, 46(23), 4342-4345.

(56) References Cited

OTHER PUBLICATIONS

Hoene, J. V., Charles, R. G., & Hickam, W. M. (1958). Thermal decomposition of metal acetylacetonates: mass spectrometer studies. The Journal of Physical Chemistry, 62(9), 1098-1101.

Shen, L. H., Bao, J. F., Wang, D., Wang, Y. X., Chen, Z. W., Ren, L., . . . & Yang, A. Q. (2013). One-step synthesis of monodisperse, water-soluble ultra-small Fe 3 O 4 nanoparticles for potential bio-application. Nanoscale, 5(5), 2133-2141.

Soo Choi, H., Liu, W., Misra, P., Tanaka, E., Zimmer, J. P., Itty Ipe, B., . . . & Frangioni, J. V. (2007). Renal clearance of quantum dots. Nature biotechnology, 25(10), 1165-1170.

Liu, W., Choi, H. S., Zimmer, J. P., Tanaka, E., Frangioni, J. V., & Bawendi, M. (2007). Compact cysteine-coated CdSe (ZnCdS) quantum dots for in vivo applications. Journal of the American Chemical Society, 129(47), 14530-14531.

Wei, R., Cai, Z., Ren, B. W., Li, A., Lin, H., Zhang, K., . . . & Gao, J. (2018). Biodegradable and renal-clearable hollow porous iron oxide nanoboxes for in vivo imaging. Chemistry of Materials, 30(21), 7950-7961.

Tong, S., Hou, S., Zheng, Z., Zhou, J., & Bao, G. (2010). Coating optimization of superparamagnetic iron oxide nanoparticles for high T2 relaxivity. Nano letters, 10(11), 4607-4613.

Maity, D., Kale, S. N., Kaul-Ghanekar, R., Xue, J. M., & Ding, J. (2009). Studies of magnetite nanoparticles synthesized by thermal decomposition of iron (III) acetylacetonate in tri (ethylene glycol). Journal of Magnetism and magnetic Materials, 321(19), 3093-3098.

Khoee, S., & Kavand, A. (2014). A new procedure for preparation of polyethylene glycol-grafted magnetic iron oxide nanoparticles. Journal of Nanostructure in Chemistry, 4, 1-6.

Zhang, M., Cao, Y., Wang, L., Ma, Y., Tu, X., & Zhang, Z. (2015). Manganese doped iron oxide theranostic nanoparticles for combined T 1 magnetic resonance imaging and photothermal therapy. ACS applied materials & interfaces, 7(8), 4650-4658.

Xia, X., Yang, M., Wang, Y., Zheng, Y., Li, Q., Chen, J., & Xia, Y. (2012). Quantifying the coverage density of poly (ethylene glycol) chains on the surface of gold nanostructures. ACS nano, 6(1), 512-522.

Huang, J. H., Parab, H. J., Liu, R. S., Lai, T. C., Hsiao, M., Chen, C. H., . . . & Hwu, Y. K. (2008). Investigation of the growth mechanism of iron oxide nanoparticles via a seed-mediated method and its cytotoxicity studies. The Journal of Physical Chemistry C, 112(40), 15684-15690.

Pereira, C., Pereira, A. M., Fernandes, C., Rocha, M., Mendes, R., Fernández-Garcia, M. P., . . . & Freire, C. (2012). Superparamagnetic MFe2O4 (M=Fe, Co, Mn) nanoparticles: tuning the particle size and magnetic properties through a novel one-step coprecipitation route. Chemistry of Materials, 24(8), 1496-1504.

Huang, J., Wang, L., Zhong, X., Li, Y., Yang, L., & Mao, H. (2014). Facile non-hydrothermal synthesis of oligosaccharide coated sub-5 nm magnetic iron oxide nanoparticles with dual MRI contrast enhancement effects. Journal of Materials Chemistry B, 2(33), 5344-5351.

Casula, M. F., Conca, E., Bakaimi, I., Sathya, A., Materia, M. E., Casu, A., . . . & Kanaras, A. G. (2016). Manganese doped-iron oxide nanoparticle clusters and their potential as agents for magnetic resonance imaging and hyperthermia. Physical Chemistry Chemical Physics, 18(25), 16848-16855.

Ai, H., Flask, C., Weinberg, B., Shuai, X. T., Pagel, M. D., Farrell, D., . . . & Gao, J. (2005). Magnetite-loaded polymeric micelles as ultrasensitive magnetic-resonance probes. Advanced Materials, 17(16), 1949-1952.

Hachani, R., Lowdell, M., Birchall, M., Hervault, A., Mertz, D., Begin-Colin, S., & Thanh, N. T. K. (2016). Polyol synthesis, functionalisation, and biocompatibility studies of superparamagnetic iron oxide nanoparticles as potential MRI contrast agents. Nanoscale, 8(6), 3278-3287.

Dong, H., Chen, Y. C., & Feldmann, C. (2015). Polyol synthesis of nanoparticles: status and options regarding metals, oxides, chalcogenides, and non-metal elements. Green chemistry, 17(8), 4107-4132.

\* cited by examiner

TEM images of iron oxide nanoparticles with continuous growth by continuous addition of starting materials. The average sizes are a) 4.0 ± 0.4 nm, b) 6.2 ± 0.5 nm, c) 8.5 ± 0.9 nm, d) 9.3 ± 1.1 nm, e) 11.3 ± 1.1 nm, and f) 13.0 ± 1.3 nm. Scale bars are 50 nm. Insets are high resolution TEM images in Figure 2 and 2 showing single crystalline structures.

TEM images of iron oxide nanoparticles obtained as prolonged the reaction time 0.5 h, 1 h, 2 h, 3 h, 4 h, and 6 h for images a-f, respectively. No reactant is added during the reaction. All scale bar are 50 nm.

X-ray powder diffraction pattern of iron oxide nanoparticle with size of a) 4 nm; b) 9 nm, c) 13 nm. Peak positions and relative intensities recorded in the literature for bulk iron oxide nanoparticles are indicated by the vertical bars.

Hydrodynamic size of iron oxide nanoparticles by dynamic lighting scattering

METHOD FOR CONTINUOUS GROWTH OF WATER-SOLUBLE MAGNETIC NANOMATERIALS

CROSS-REFERENCE TO RELATED APPLICATION

This application claims the benefit of U.S. Provisional Application Ser. No. 62/807,407, filed on Feb. 19, 2019, which is incorporated herein by reference in its entirety.

STATEMENT REGARDING FEDERALLY SPONSORED RESEARCH OR DEVELOPMENT

This invention was made with government support under grant HRD-1700390 awarded by the National Science Foundation. The government has certain rights in the invention.

FIELD OF THE INVENTION

The present invention is generally directed towards a method for growth of water-soluble magnetic nanomaterials. In particular, the present invention is directed towards a method for synthesis of water-soluble metal oxide nanoparticles.

BACKGROUND OF THE INVENTION

In the recent years, synthesis of well-defined nanoparticles has been of great interest, but nanometer level size control in nanoparticles synthesis remains empirical. In particular, the size and size distribution of metal-oxide nanoparticles dictate the properties and application of nanomaterials, especially for, iron oxide nanoparticles. Various methods such as, but not limited to, co-precipitation method, is utilized for synthesizing water-soluble metal oxide nanoparticles (e.g. iron oxide nanoparticles) in aqueous solution. Due to low reaction temperature, the co-precipitation method demonstrates poor control in size, shape, and size distribution of the generated nanoparticles.

Thermal decomposition method has been widely used for controlled synthesis of iron oxide nanoparticles. The size of nanoparticles is manipulated by varying different organic solvents and aging time in the thermal decomposition method. Furthermore, one nanometer-scale size control in the synthesis of monodisperse nanoparticles is achieved by applying seed-mediated growth method with a typical size range of about 6-12 nm. Due to the use of nonpolar organic solvents and relatively high thermal stability of precursors, growth step can be separated from nucleation step.

However, the iron oxide nanoparticles synthesized using the thermal decomposition method are hydrophobic. Consequently, a surface modification procedure is required to render the iron oxide nanoparticles water-soluble for a suitable biomedical application. Such surface modification processes are time consuming and produce severe aggregations. Aggregation and low reproducibility result in suboptimal dispersity and stability of iron oxide nanoparticles in aqueous solution.

SUMMARY OF THE INVENTION

It is an aim of the invention to provide for a method for continuous growth of water-soluble metal oxide nanoparticles. It is yet another aim of the invention to provide for a method to synthesize water-soluble metal oxide nanoparticles with precise control of the particle size at a nanometer scale. It is still further an aim of the invention to synthesize water-soluble iron oxide nanoparticles with stepwise size increase at nanometer scale through continuous growth in polyols. Disclosed synthesis methods using living growth of iron oxide nanoparticles achieve a broad range of sizes with high reproducibility. In addition, the synthesized water-soluble iron oxide nanoparticles exhibit high colloidal stability in physiological solutions with different pHs. Furthermore, the synthesized water-soluble iron oxide nanoparticles exhibit high transversal relaxivity and high longitudinal relaxivity which is significantly different from that of nanoparticles with the same size synthesized by existing methods.

Embodiments of a method for synthesizing water-soluble metal oxide nanoparticles are disclosed. In one embodiment, the method includes heating a first reaction mixture at a predetermined temperature for a predetermined time duration with continuous stirring to obtain a second reaction mixture that comprises water-soluble metal oxide nanoparticles of a first size. The first reaction mixture includes a reactant and a polyol. The method further includes adding a first predetermined amount of the reactant to the second reaction mixture to obtain a third reaction mixture. The method further includes heating the third reaction mixture at the predetermined temperature for the predetermined time duration with continuous stirring to obtain a fourth reaction mixture comprising water-soluble metal oxide nanoparticles of a second size. In an embodiment, the method further includes heating the first reaction mixture at an initial temperature for an initial time duration prior to the heating of the first reaction mixture at the predetermined temperature for the predetermined time duration. In an embodiment, the reactant is $Fe(acac)_3$ and the polyol is diethylene glycol (DEG). The water-soluble metal oxide nanoparticles correspond to water-soluble iron oxide nanoparticles. In yet another embodiment, the initial temperature is in the range of around 100° C. to 140° C. and the initial time duration is in the range of around 1 to 3 hours. In one embodiment, the predetermined temperature is in the range of around 200° C. to 240° C. and the predetermined time duration is in the range of about 1 to 2 hours. In another embodiment, the second size of the metal oxide nanoparticles comprised in the fourth mixture is dependent at least in part on the first predetermined amount of the reactant added to the second reaction mixture. In yet another embodiment, the second size is greater than the first size.

BRIEF DESCRIPTION OF FIGURES

FIG. 9 depicts the colloidal stability of water-soluble iron oxide nanoparticles synthesized by the disclosed methods in biological relevant solutions at different pHs. Individually.

DETAILED DESCRIPTION

Figure 1:
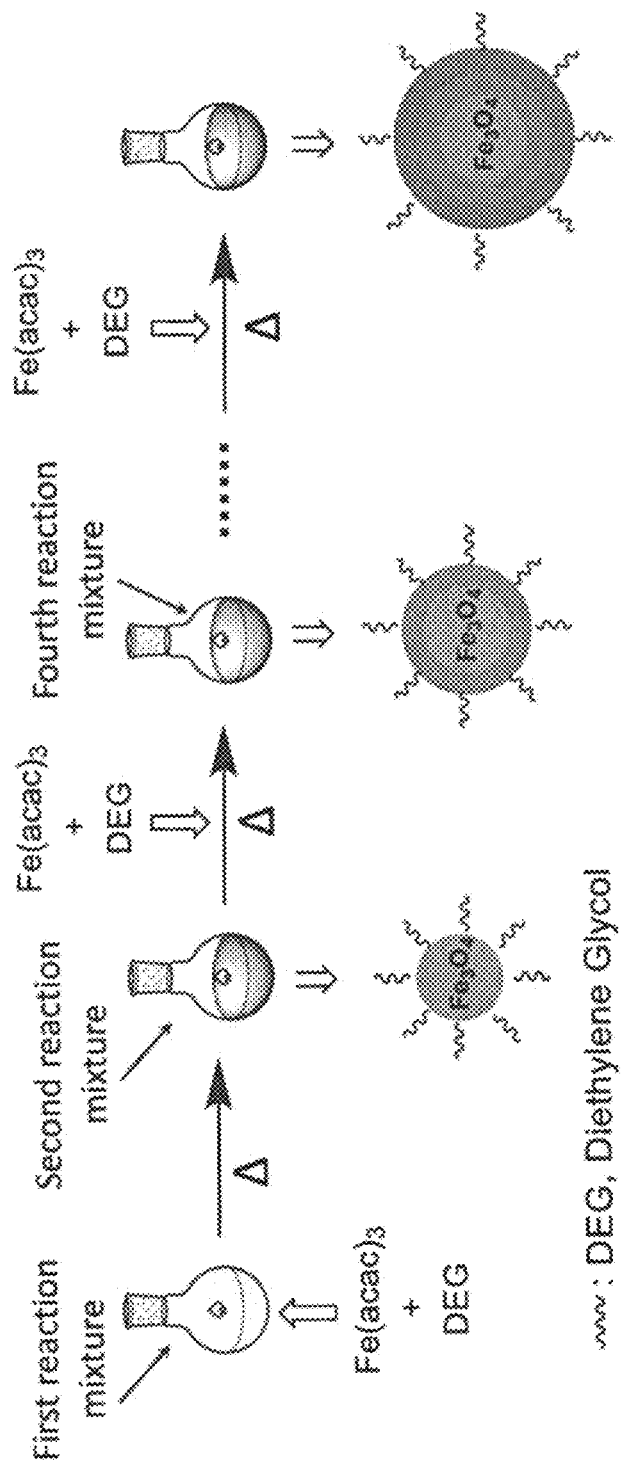
FIG. 1 depicts a method for continuous synthesis of water-soluble iron oxide nanoparticles with nanometer level size control.

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one with high skilled in the art, and the general principles defined herein may be applied to other embodiments and applications without departing from the scope of the invention. The present invention is not intended to be limited to the embodiments shown but is to be accorded the widest possible scope consistent with the principles and features disclosed herein.

The present invention provides for a novel method for synthesizing or continually growing water-soluble metal oxide particles of incremental sizes that exhibit properties suitable for use in biomedical applications. The methods disclosed herein do not need a surface modification of the nanoparticles to make them water-soluble because the as-generated metal oxide nanoparticles are highly water-soluble. The present invention makes use of living growth of nanoparticles in an amphiphilic solvent, such as polyol to synthesize nanoparticles of increasing sizes in a stepwise manner by recursively adding a reactant to the reactant mixture.

As a non-limiting example of metal oxide nanoparticles or magnetic nanoparticles, iron oxide nanoparticles are very attractive due to their unique magnetic properties and excellent biocompatibility. They are useful in a wide range of applications, including magnetic separation, disease diagnosis, drug delivery, and magnetic hyperthermia treatment. The size of iron oxide nanoparticles plays a critical role in their magnetic properties and applications. Certain specific application involves the development of high-performance contrast agents for noninvasive magnetic resonance (MR) imaging. Since, iron oxide nanoparticles need to be water-soluble for many of their applications, particularly for biomedical applications, developing new methods to synthesize water-soluble nanoparticles with nanometer-scale size control is significant both scientifically and technically.

The present invention discloses a continuous growth method to synthesize water-soluble iron oxide nanoparticles in an amphiphilic solvent such as polyols (e.g. diethylene glycol). The disclosed method not only grows iron oxide nanoparticles with precise size control (nanometer-scale size increment), but also provides high water solubility without requiring any surface modification. More remarkably, the synthesized iron oxide nanoparticles exhibit high transversal relaxivity which is the highest among that synthesized by aqueous solution and organic solvents in the same size. The synthesized water-soluble iron oxide nanoparticles can potentially be used for high performance $T_2$-weighted magnetic resonance imaging (MRI).

Although the detailed description of figures will refer to methods of synthesis for water-soluble iron oxide nanoparticles, it would be appreciated by those skilled in the art that the disclosure is not to be restricted to iron oxide nanoparticles and can be extended to any metal oxide nanoparticles or magnetic nanomaterials without deviating from the scope of the present invention.

FIG. 1 depicts a method for continuous synthesis of water-soluble iron oxide nanoparticles with nanometer level size control. The method includes providing a (first) reaction mixture formed by mixing a reactant and a polyol. In an embodiment, Fe(acac)$_3$ is used as a reactant for synthesizing water-soluble iron oxide nanoparticles. At a predetermined concentration, the reactant decomposes and adds to the surface of existing nanoparticle to form larger iron oxide nanoparticles as shown in the FIG. 1. According to an embodiment, the size of iron oxide nanoparticles can be precisely manipulated in an amphiphilic solvent, preferably a polyol, such as, diethylene glycol (DEG) by separating the nucleation and growth steps by adding the reactant.

Fe(acac)$_3$ is selected as an exemplary reactant because it is soluble in DEG and its decomposition temperature (186° C.) is lower than the boiling point of DEG (245° C.). In addition, DEG is selected as the amphiphilic solvent because of its capability to dissolve both inorganic salt and organic compounds due to its high dielectric constant. Furthermore, DEG can act as both a reducing agent and a coating material thereby eliminating any need for extra capping agents such as oleic acid, oleic alcohol, 1,2 hexadecanediol as used in conventional methods. Also, the high boiling point of DEG (245° C.) can provide high reaction temperature which is favored for high crystallinity of iron oxide nanoparticles. It may be appreciated by those skilled in the art that any other polyol having similar properties as DEG can be used for the purposes of the ongoing description without departing from the scope of the disclosed methods. Exemplary solvents can include other polyols, for example, tetraethylene glycol, triethylene glycol, and polyethylene glycol having a molecular weight lying in the range of about 1000 and 8000. In certain embodiments, a polyethylene glycol having a molecular weight of 1000, 2000, 5000, or 8000 is selected as the polyol. In the present invention, addition of the reactant (e.g. Fe(acac)$_3$) to the existing nanoparticles (in the heated reaction mixture) is preferred because a new nucleation requires higher energy. The disclosed method employs a living growth mechanism in the synthesis of iron oxide nanoparticles in diethylene glycol (DEG).

In an embodiment, the first reaction mixture is formed by dissolving (88 mg, 0.25 mmol of) commercially available iron (III) acetylacetonate (Fe(acac)$_3$) as a reactant in (2.5 mL) of a polyol such as DEG. The method further includes heating the first reaction mixture at an initial temperature (e.g. 100-130° C.) for an initial time duration (e.g. 1-3 hours) under the protection of argon to expel off any moisture in the reaction mixture. The method then proceeds to heating of the first reaction mixture to a predetermined temperature (between 200-240° C.) for a predetermined time duration (e.g. 0.5-2 hours) with continuous stirring to obtain a second reaction mixture (as shown in FIG. 1). The second reaction mixture includes water-soluble iron oxide nanoparticles having a first size (e.g. 4.0±0.4 nm).

In order to obtain nanoparticles of larger particle sizes, the method proceeds to the next step of adding predetermined amount of the reactant (e.g. Fe(acac)$_3$ in polyol) to the second reaction mixture to obtain a third reaction mixture (not shown). The method further includes the step of heating the third reaction mixture at the predetermined temperature (e.g. around 230° C.) and for the predetermined time duration (e.g. about 2 hours) with continuous stirring to obtain a fourth reaction mixture (as shown in FIG. 1). The fourth reaction mixture includes water-soluble iron oxide nanoparticles having a second size (e.g. 6.2±0.5 nm). In an embodiment, the second size is greater than the first size as indicated in FIG. 1. After each heating operation, the iron oxide nanoparticles can be separated from the respective reaction mixtures (e.g. second reaction mixture, fourth reaction mixture) and purified to obtain water-soluble iron oxide nanoparticles of corresponding sizes.

For monitoring the particle size of the nanoparticles synthesized in accordance with the disclosed method, small amount of second reaction mixture can be taken out before the predetermined amount of reactant (e.g. Fe(acac)$_3$) is added to the second reaction mixture. The addition and heating operation can be repeated recursively/multiple times for further growth of the nanoparticle size and obtain water-soluble nanoparticles of larger sizes (e.g. a third size that is larger than the second size and the first size). Growth from the existing nanoparticles (e.g. nanoparticles of first size, nanoparticles of second size) is thermodynamically preferred because the formation of new nuclei requires higher energy.

Another embodiment of a method for continuous synthesis of water-soluble metal oxide nanoparticles of varying sizes is disclosed. The method includes the step of performing a first heating operation on a reaction mixture at an initial temperature (e.g. around 120° C.) for an initial time duration (e.g. about an hour) to expel moisture content (if any). The initial temperature is in the range of around 100° C. to 140° C. and the initial time duration is in the range of around 1-3 hours. The reaction mixture includes a reactant and a polyol. In an embodiment, the reactant is selected from a group that includes Fe(acac)$_3$, Mn(acac)$_2$, Ni(acac)$_2$, Co(acac)$_2$, Iron (II) acetate (Fe(C$_2$H$_3$O$_2$)$_2$) and the like. In an embodiment, the polyol is selected from a group that includes DEG, tetraethylene glycol-, triethylene glycol, and polyethylene glycols having a molecular weight of 1000, 2000, 5000, and 8000. In an embodiment, the water-soluble metal oxide nanoparticles correspond to water-soluble iron oxide nanoparticles. The method further includes the step of performing a second heating operation on the reaction mixture obtained from the first heating operation. The second heating operation is performed at a predetermined temperature (e.g. around 230° C.) and for a predetermined time duration (e.g. about 2 hours) to obtain water-soluble metal oxide nanoparticles of a first size (e.g. 4.0±0.4 nm). The predetermined temperature is in the range of around 200° C. to 240° C. and the predetermined time duration is in the range of about 0.5-2 hours.

The method further includes the step of adding a predetermined amount of the reactant (e.g. Fe(acac)$_3$) to the reaction mixture obtained from the second heating operation. The predetermined amount of the reactant impacts the size of the metal oxide nanoparticle resulting out of the next heating operation. The method further includes the step of performing a third heating operation, on the reaction mixture obtained from the adding of the predetermined amount of reactant, at the predetermined temperature (e.g. around 230° C.) and for a predetermined time duration (e.g. about 2 hours) to obtain water-soluble metal oxide nanoparticles of a second size. The second size, in an embodiment, is around 6.2±0.5 nm.

Embodiments for a method of synthesizing water-soluble metal oxide nanoparticles having incremental particle sizes are disclosed herein. In an embodiment, the method includes the step of performing a heating operation on a reaction mixture at a predetermined temperature (e.g. around 230° C.) and for a predetermined time duration (e.g. about 2 hours) to obtain water-soluble metal oxide nanoparticles of a first size (e.g. 4.0±0.4 nm). The reaction mixture includes a reactant and a polyol. In an embodiment, the reactant is selected from a group that includes Fe(acac)$_3$, Mn(acac)$_2$, Ni(acac)$_2$, Co(acac)$_2$, Iron(II) acetate (Fe(C$_2$H$_3$O$_2$)$_2$) and the like. In an embodiment, the polyol is selected from a group that includes DEG, tetraethylene glycol, triethylene glycol, and polyethylene glycols having a molecular weight of 1000, 2000, 5000, and 8000.

The method further includes performing the following steps recursively:

1. a first step of an addition operation of a predetermined amount of the reactant to the reaction mixture (e.g. the second reaction mixture) obtained from a previous heating operation, and;

2. a second step of a heating operation on the reaction mixture (e.g. third reaction mixture), obtained from the addition operation, at the predetermined temperature for the predetermined time duration to obtain water-soluble metal oxide nanoparticles.

As seen in FIG. 1, the particle size of water-soluble metal oxide nanoparticles obtained from every heating operation is greater than the particle size of water-soluble metal oxide nanoparticles obtained from a previous heating operation. Due to the recursive addition and heating operation, there is a stepwise increase in particle size of metal oxide nanoparticles at a nanometer scale as shown in FIG. 1.

In an embodiment, the method further includes the step of performing a preliminary heating operation on the reaction mixture (e.g. first reaction mixture) at an initial temperature for an initial time duration prior to performing any heating operation. In an embodiment, the recursive steps of addition operation and heating operation are performed multiple times (e.g. 2 to 6) times to obtain water-soluble metal oxide nanoparticles having particle sizes in the range of about 4 nm to about 13 nm. In an embodiment, the synthesized water-soluble metal oxide nanoparticles having the size of around 4 nm exhibit a transversal relaxivity of around 154 mmol$^{-1}\cdot$s$^{-1}$ and a longitudinal relaxivity of around 23.5 mmol$^{-1}\cdot$s$^{-1}$. In yet another embodiment, the synthesized water-soluble metal oxide nanoparticles having the size of around 9 nm exhibit a transversal relaxivity of around 425 mmol$^{-1}\cdot$s$^{-1}$ and a longitudinal relaxivity of around 32 mmol$^{-1}\cdot$s$^{-1}$. In an embodiment, the decomposition temperature of the reactant is lower than the boiling point of the polyol. In an embodiment, the water-soluble metal oxide nanoparticles correspond to water-soluble iron oxide nanoparticles.

Embodiments of a method for synthesizing water-soluble metal oxide nanoparticles are disclosed. In one embodiment, the method includes heating a first reaction mixture at a predetermined temperature for a predetermined time duration with continuous stirring to obtain a second reaction mixture that comprises water-soluble metal oxide nanoparticles of a first size. The first reaction mixture includes a reactant and a polyol. The method further includes adding a first predetermined amount of the reactant to the second reaction mixture to obtain a third reaction mixture. The method further includes heating the third reaction mixture at the predetermined temperature for the predetermined time duration with continuous stirring to obtain a fourth reaction mixture comprising water-soluble metal oxide nanoparticles of a second size.

In an exemplary embodiment, the reactant is Fe(acac)$_3$ and the polyol is diethylene glycol. The water-soluble metal oxide nanoparticles correspond to water-soluble iron oxide nanoparticles. In an embodiment, the method further includes heating the first reaction mixture at an initial temperature for an initial time duration prior to the heating of the first reaction mixture at the predetermined temperature for the predetermined time duration. The initial temperature is in the range of around 100° C. to 140° C. and the initial time duration is in the range of around 1-3 hours. In an exemplary embodiment, the initial temperature is around 120° C. and the initial time duration is around 1 hour. In certain embodiments, the method further includes separating the water-soluble metal oxide nanoparticles from the respective reaction mixtures and purifying the separated water-soluble metal oxide nanoparticles. The predetermined temperature is in the range of around 200° C. to 240° C. and the predetermined time duration is in the range of about 0.5-2 hours. In an exemplary embodiment, the predetermined temperature is about 230° C. and the predetermined time duration is about 2 hours.

In another embodiment, the second size of the metal oxide nanoparticles comprised in the fourth mixture is dependent at least in part on the first predetermined amount of the reactant added to the second reaction mixture. In yet another embodiment, the second size is greater than the first size. In another embodiment, the method further includes adding a second predetermined amount of the reactant to the fourth reaction mixture to obtain a fifth reaction mixture (not shown) and heating the fifth reaction mixture at the predetermined temperature for the predetermined time duration with continuous stirring to obtain a sixth reaction mixture (not shown) comprising water-soluble metal oxide nanoparticles of a third size. In one embodiment, the third size is greater than the second size and the first size. In one embodiment, the first size, the second size, and the third size of the metal oxide nanoparticles lie in the range of about 4 nm to 13 nm.

Comparing to existing methods of synthesis of iron oxide nanoparticles in polyols, the disclosed methods provide for a continuous growth mechanism for direct synthesis of water-soluble iron oxide nanoparticles in polyols. Further, the disclosed methods provide for precise control of size of monodisperse nanoparticles at a nanometer scale within broad size range. In an embodiment, the disclosed methods provide for control of size of nanoparticles in the range of about 4 nm to about 13 nm.

Figure 2:
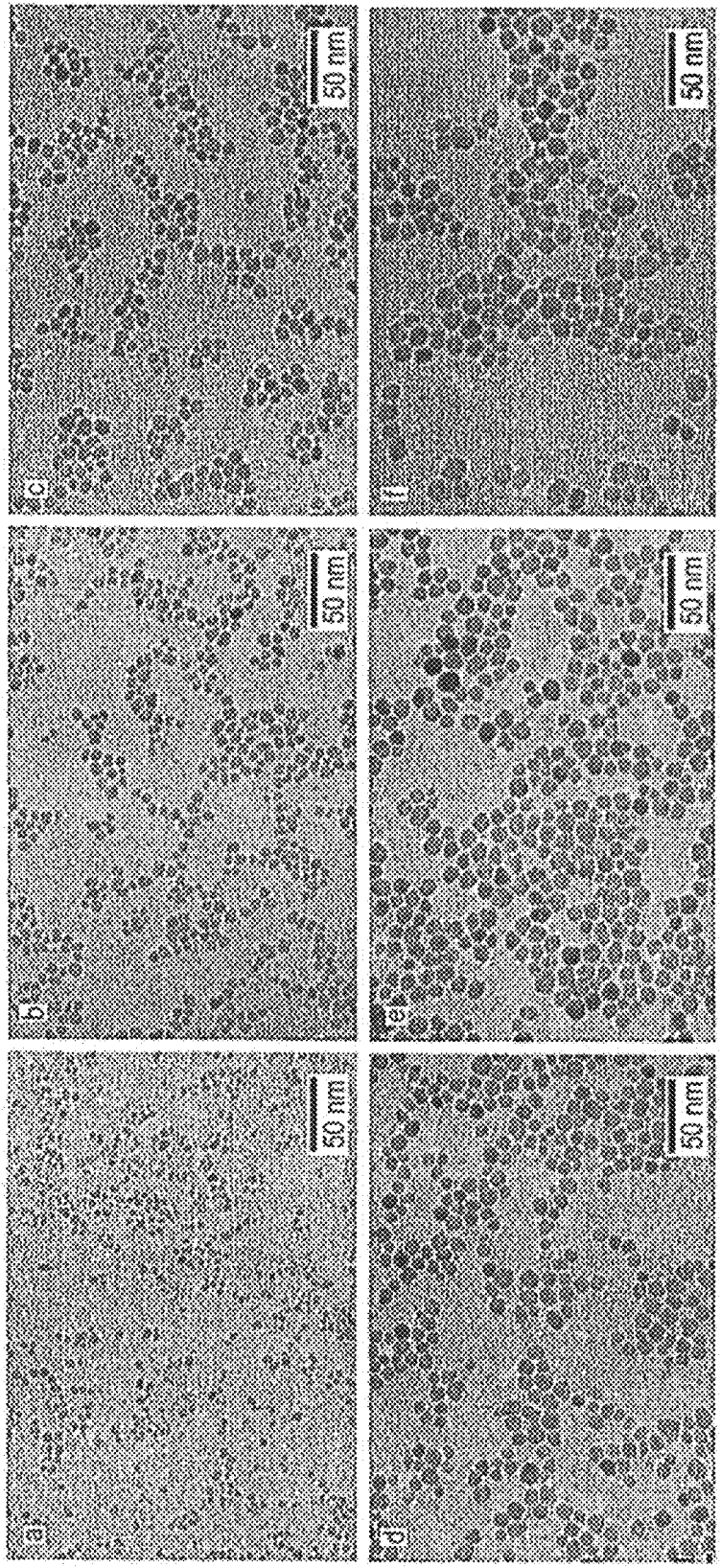
FIG. 2 depicts TEM images of water-soluble iron oxide nanoparticles with continuous growth by continuous addition of reactant.

FIG. 2 depicts Transmission Electron Microscopy (TEM) images of iron oxide nanoparticles with continuous growth by continuous addition of reactant. The TEM measurements shown in the figure were recorded for the iron oxide nanoparticles taken directly from small sample amount of reaction mixture after each heating operation. The average sizes measured in six samples are about a) 4.0±0.4 nm, b) 6.2±0.5 nm, c) 8.5±0.9 nm, d) 9.3±1.1 nm, e) 11.3±1.1 nm, and f) 13.0±1.3 nm. FIG. 2 uses scale bars that are 50 nm. Further, FIG. 2 depicts insets that are high resolution TEM images in (c) and (f), showing single crystalline structures. As shown in TEM images, the size of water-soluble iron oxide nanoparticles continuously grows with the addition of the reactant (e.g. Fe(acac)$_3$) to the reaction mixture after each heating operation. In an embodiment, the first size of about 4.0±0.4 nm is obtained in the first 2 hours of heating at 230° C. Upon adding a predetermined amount of reactant (e.g. Fe(acac)$_3$) to the reaction mixture for the first time and heating the reaction mixture for 2 hours at 230° C., the particle size grows to about 6.2±0.5 nm. In an embodiment, the recursive step of adding and heating can be performed 5 times to obtain water-soluble iron oxide nanoparticles having sizes in a broad range of about 4 nm to 13 nm. The large sizes of water-soluble metal oxide nanoparticles obtained from the disclosed methods is higher than that of metal oxide nanoparticles obtained from conventional thermal decomposition methods in organic solvent.

Figure 3:
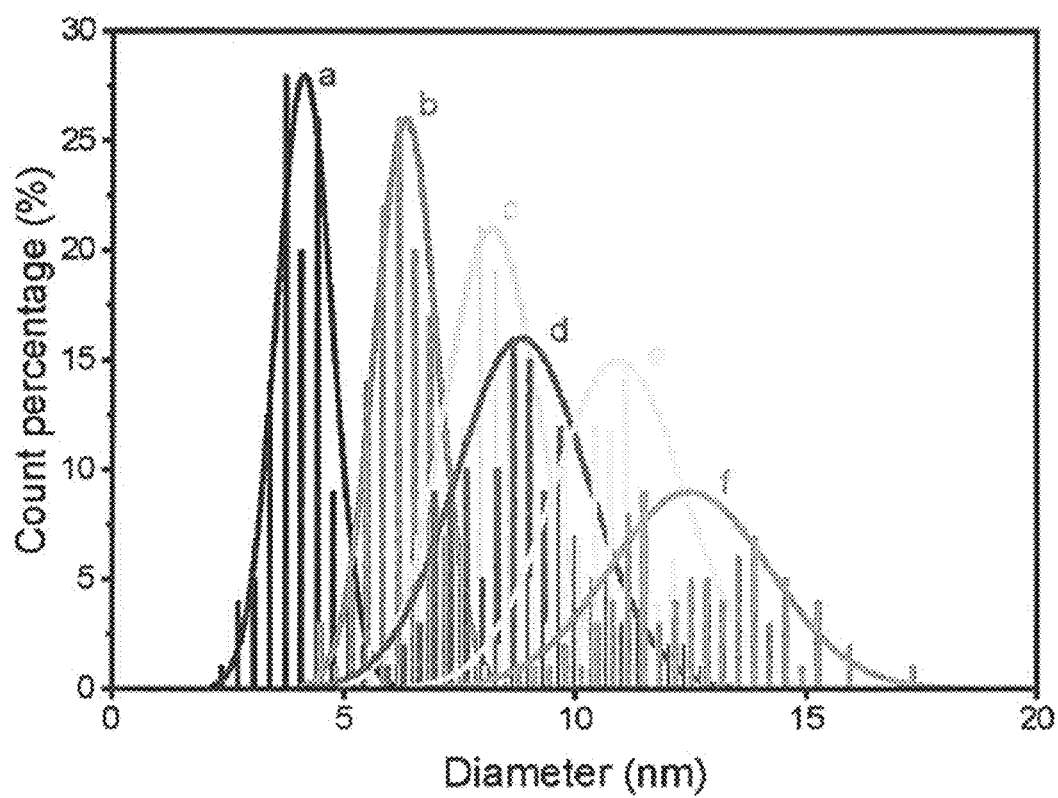
FIG. 3 depicts histograms for the size of water-soluble iron oxide nanoparticles by TEM through addition of reactant.

Furthermore, the size of metal oxide nanoparticles obtained from disclosed methods is uniform across all sizes within a broad size range (e.g. about 4 nm to 13 nm). The standard deviations in particle size are comparable to that obtained in organic solvent. For example, a typical size from this study is 8.5±0.9 nm as shown in FIG. 2(c), while similar size of 9.3±0.7 nm was obtained in 1-octadecene. FIG. 3 depicts histograms for the size of iron oxide nanoparticles by TEM through addition of starting materials (e.g. reactant in polyol). As shown, the average sizes are about: (a) 4.0±0.4 nm, (b) 6.2±0.5 nm, (c) 8.5±0.9 nm, (d) 9.3±1.1 nm, (e) 11.3±1.1 nm, and (f) 13.0±1.3 nm. The disclosed continuous growth mechanism is plausible because the by-products from the reactant (e.g. Fe (acac)$_3$) decomposition are gaseous and escape from the reaction system thereby preventing any accumulation of the by-products in the reaction system. In addition, Fe(acac)$_3$ is the only reactant and no coating agents are used or needed in the disclosed methods. Another aspect of the present invention is that the reaction mixture component does not change during the method of synthesis which is different from the conventional seed-mediated thermal decomposition method.

Figure 4:
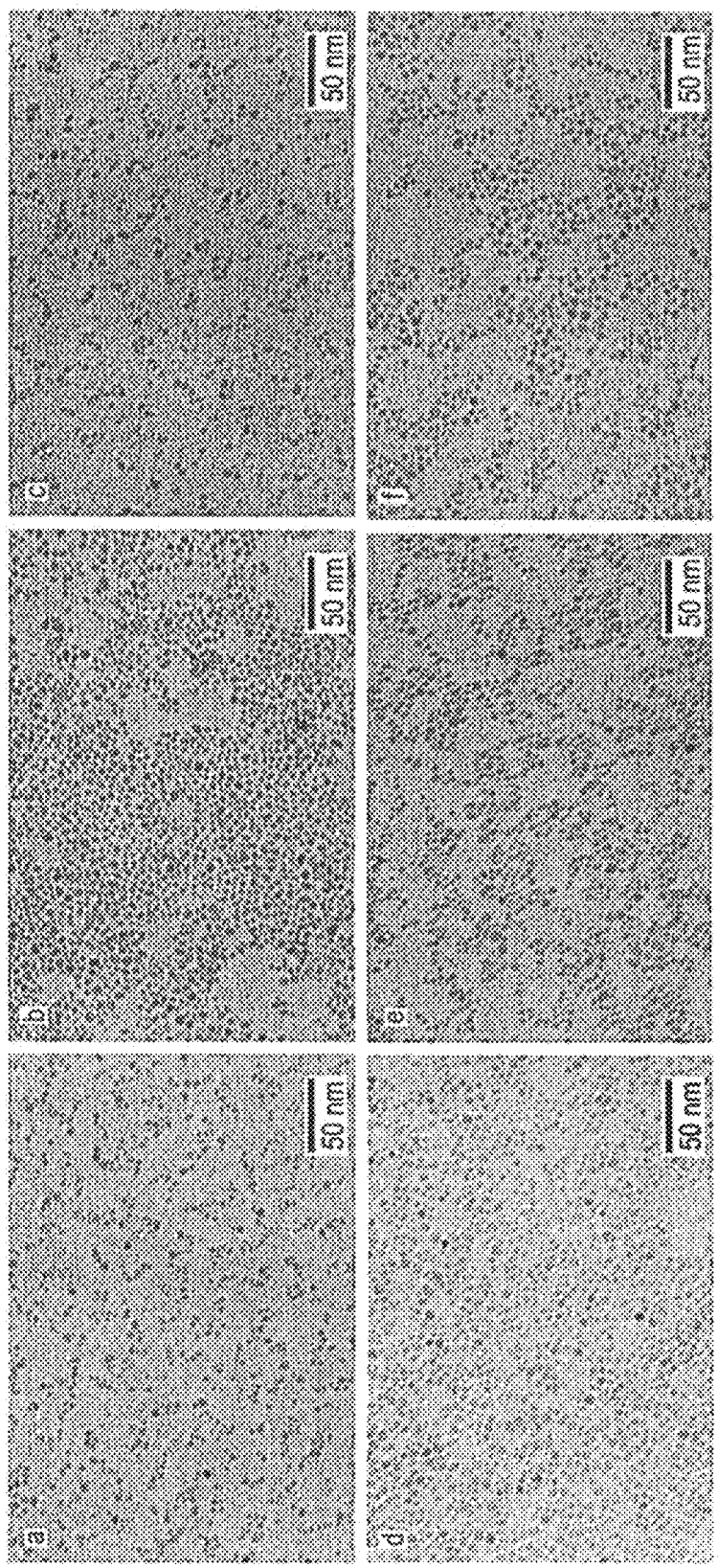
FIG. 4 depicts TEM images of water-soluble iron oxide nanoparticles obtained at the reaction time: 0.5 hour, 1 hour, 2 hours, 3 hours, 4 hours, and 6 hours in images a, b, c, d, e, and f respectively.

The growth in nanoparticle size in the disclosed methods is not caused by Ostwald ripening process or possible time effect. To confirm this, a control reaction (heating operation at 230° C.) was set up without addition of reactant (e.g. Fe(acac)$_3$). Small amount of reaction mixture was taken out for particle size measurement at different time points during a six-hour heating period without adding the reactant during the control reaction. FIG. 4 depicts TEM images (scale bars are 50 nm) of iron oxide nanoparticles obtained at the reaction time:

0.5 hour, 1 hour, 2 hours, 3 hours, 4 hours, and 6 hours in images a, b, c, d, e, and f respectively. The TEM images show that there is no change of particle size when the reaction time increases from 0.5 hour to 6 hours. The result confirms that the size of water-soluble iron oxide nanoparticles does not change if the reactant (e.g. Fe(acac)$_3$) is not added even though the reaction time (heating operation) is prolonged to 6 hours.

The conversion rate of reactant in the disclosed method was monitored to determine that the average yield is about 91%. Over 90% of Fe(acac)$_3$ is converted into nanoparticles at 0.5 hour of heating operation (e.g. second heating operation, fourth heating operation). The high conversion yield rate and the unchanged size over heating/reaction time indicate that the Ostwald ripening is not significant in the disclosed method of synthesis of metal oxide nanoparticles. Therefore, in the disclosed methods, the size of metal oxide nanoparticles is tuned or controlled by addition of reactant to the reaction mixture and not due to other factors.

Figure 5:
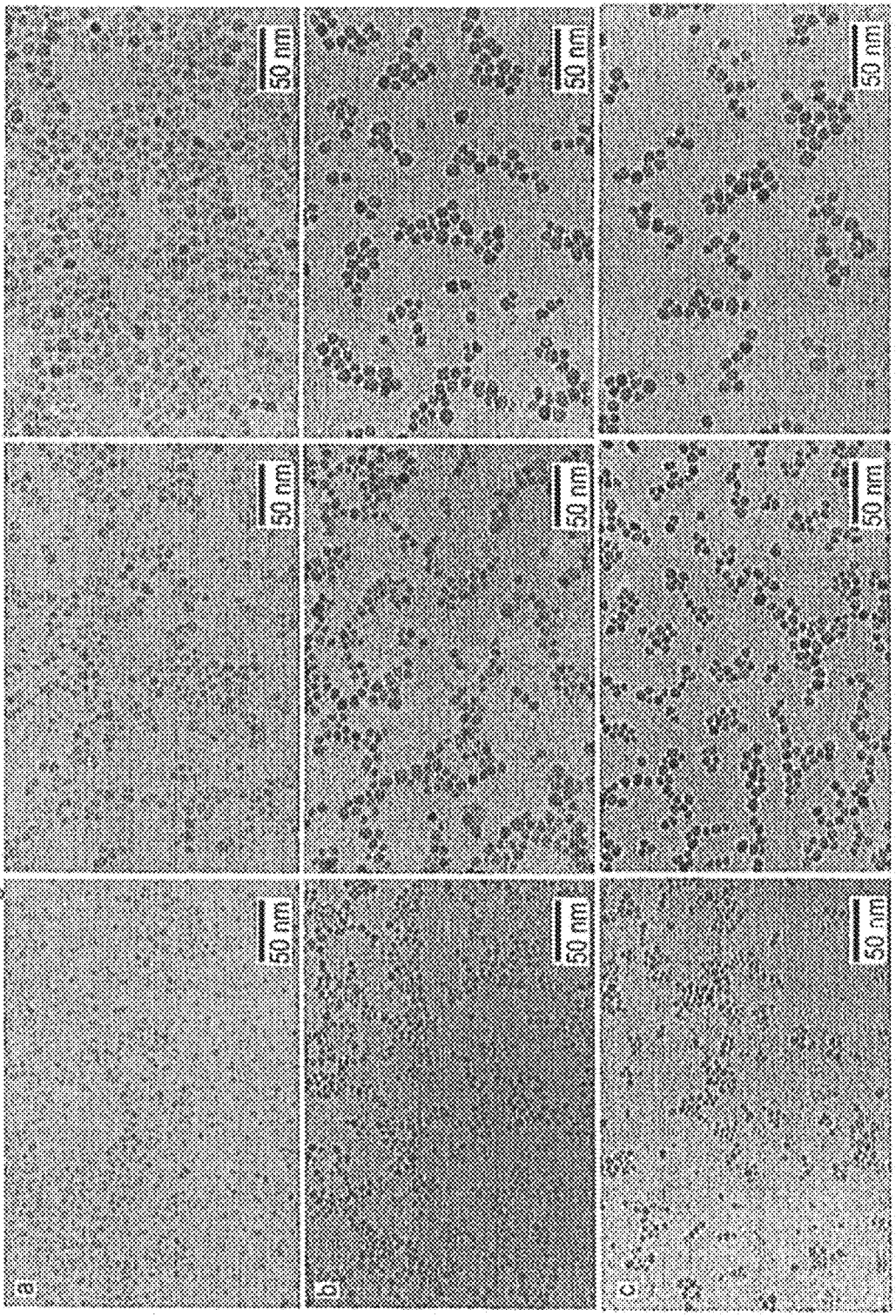
FIG. 5 depicts TEM images for reproducibility of water-soluble iron oxide nanoparticles from three batches and the first, second, and third growth in each batch.

The disclosed method for synthesis of metal oxide nanoparticles is highly reproducible based on batch experiments conducted. FIG. 5 depicts TEM images for reproducibility of iron oxide nanoparticles from three batches and the first, second, and third growth in each batch. The three batches i.e. batch 1 {a, b, c}, batch 2 {d, e, f} and batch 3 {g, h, i} and the three growth stages for respective batches are shown (horizontally for each batch) in the FIG. 5. In each batch, the reactant (e.g. Fe(acac)$_3$) was added to prepare iron oxide nanoparticles for three different sizes (corresponding to 3 growth stages). The increase of particle size of nanoparticles is clearly observed when the reactant (e.g. Fe(acac)$_3$) is added for every batch. For example, the sizes are 4.2±0.7 nm, 6.9±1.2 nm, and 9.5±1.4 nm for batch "1" in FIG. 5.

Figure 6:
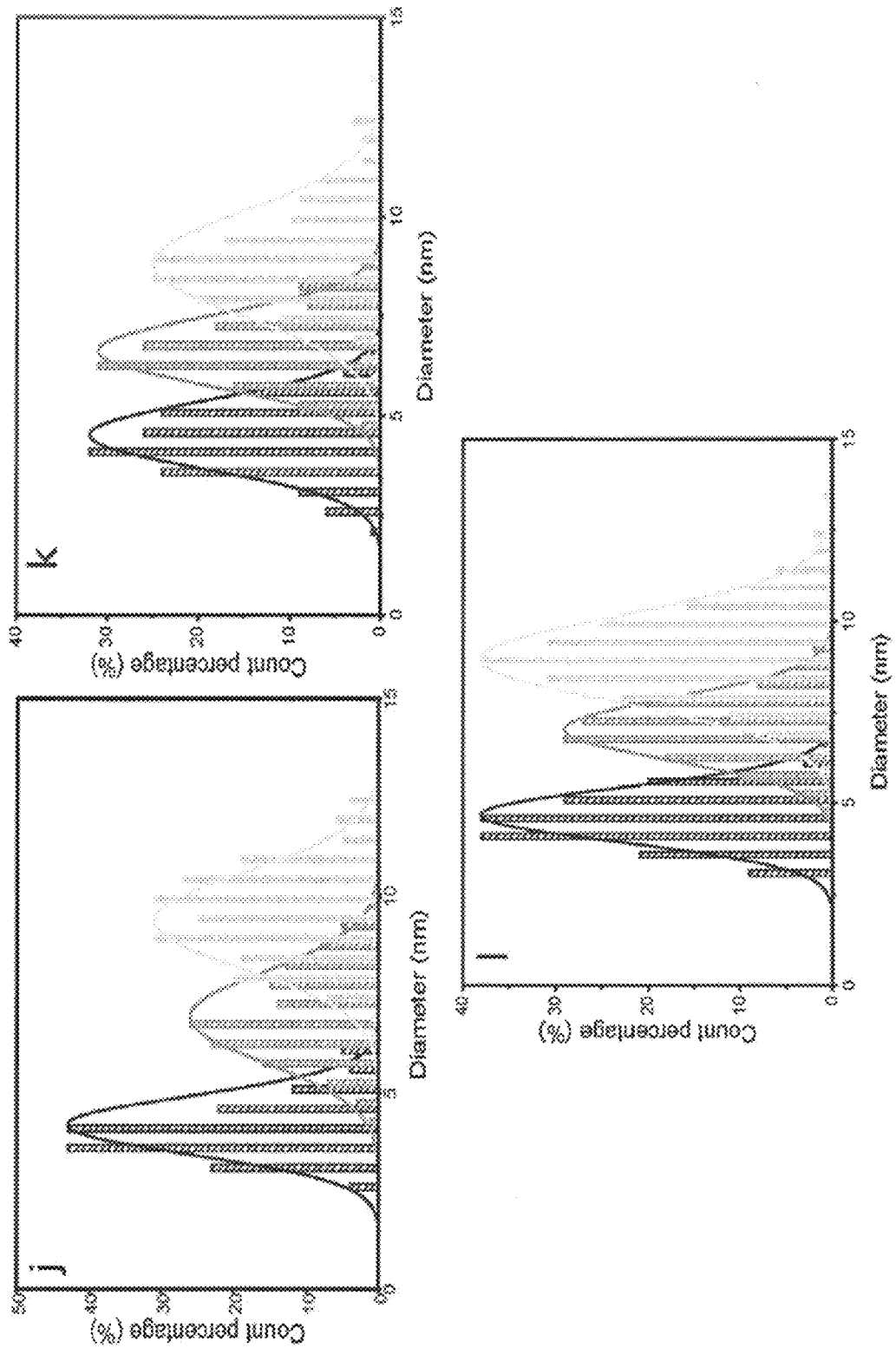
FIG. 6 depicts histograms made from size analysis of water-soluble iron oxide nanoparticles by TEM for three batches.

FIG. 6 depicts histograms made from size analysis of iron oxide nanoparticles by TEM (for the three batches as described above in relation to FIG. 5). This figure shows histograms made from size analysis of iron oxide nanoparticles for the first batch (j), the second batch (k) and the third batch (l). There was no significant size difference observed from batch to batch. It may be possible that a slight size difference exists among different batches since nucleation is a thermodynamic process. The result of the experiment shows that the particle size from different batches is almost the same, implying that nucleation is not very sensitive to the reaction conditions of disclosed methods. The results of the size analysis to determine the particle sizes of 3 batches are summarized in Table 1 below. As shown, different batches have very small difference in values of first size, second size and third size of nanoparticles due to subsequent addition of reactant to the reaction mixture in each reaction.

TABLE 1

| Size of iron oxide nanoparticles synthesized from continuous growth in batches | | | |
|---|---|---|---|
| Size | 1$^{st}$ Batch | 2$^{nd}$ Batch | 3$^{rd}$ Batch |
| First Size (nm) | 4.2 ± 0.7 | 4.5 ± 0.8 | 4.6 ± 0.7 |
| Second Size (nm) | 6.9 ± 1.2 | 6.6 ± 0.9 | 7.0 ± 0.9 |
| Third Size (nm) | 9.5 ± 1.4 | 8.8 ± 1.3 | 9.0 ± 1.2 |

Figure 7:
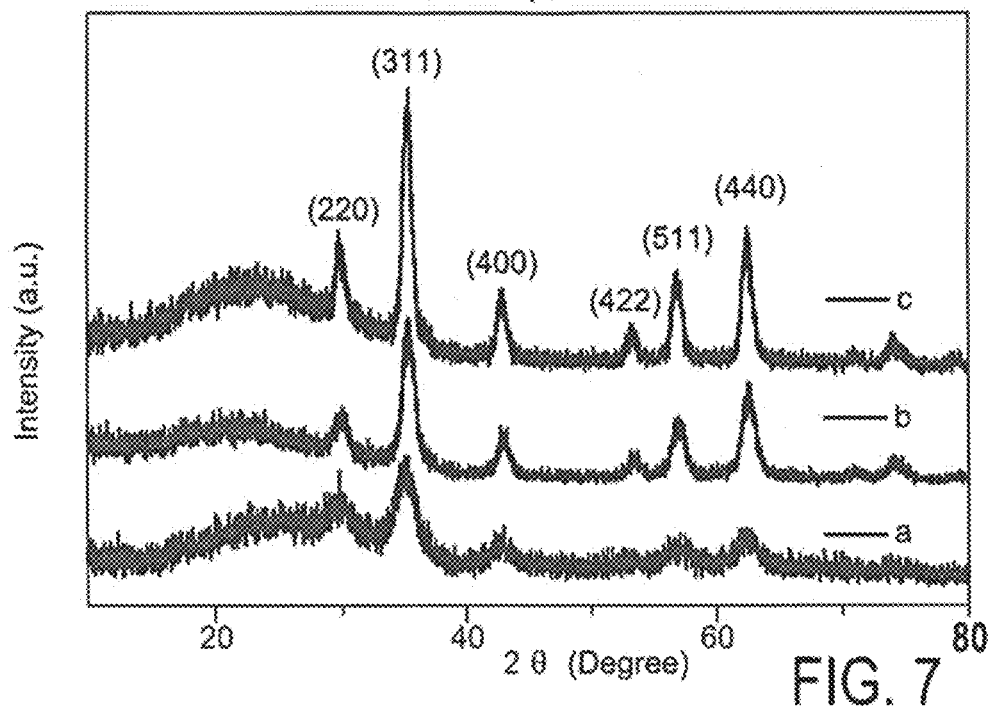
FIG. 7 depicts X-ray powder diffraction pattern of water-soluble iron oxide nanoparticle with size of a) 4 nm, b) 9 nm, c) 13 nm.

FIG. 7 depicts X-ray powder diffraction (XRD) pattern of iron oxide nanoparticle with sizes of (a) 4 nm, (b) 9 nm, and (c) 13 nm respectively. All the diffraction peaks are indexed to the spinet structure known for the iron oxide crystal. Peak positions and relative intensities recorded for bulk iron oxide nanoparticles are indicated by the vertical bars. As seen in the figure, with the increase of particle size of nanoparticles, the peak of XRD pattern becomes sharper and the associated intensity becomes higher. The results shown in figure indicate an increase in crystal domain with an increase in particle size. According to Debye-Scherrer equation, the crystal domain sizes of iron oxide nanoparticles were calculated as 4.4 nm, 7.7 nm, and 10.3 nm respectively. The sizes are in good agreement with average diameters measured by TEM. The results show that the nanoparticles exhibit high crystallinity, and each particle is nearly formed by a single crystal which is consistent with the mechanism of slow and continuous growth as per the disclosed methods embodying the present invention. The result also proves that the larger metal oxide nanoparticles can be produced by continuous growth from the smaller metal oxide nanoparticles after addition of reactant, instead of the aggregation of smaller nanoparticles themselves.

As described supra, the synthesized iron oxide nanoparticles are water-soluble immediately without any need for sophisticated ligand exchange. It is to be noted that all TEM images in the experiments disclosed herein have been taken from aqueous solution of water-soluble iron oxide nanoparticles. The iron oxide nanoparticles synthesized from disclosed methods were dispersed very well for all sizes in the TEM images.

Figure 8:
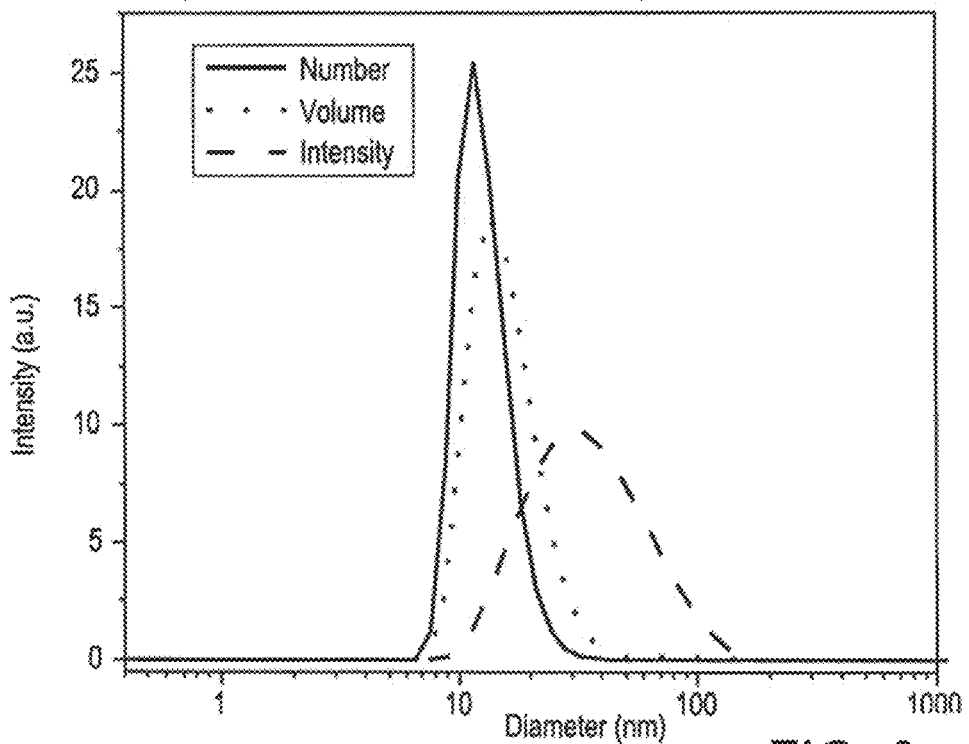
FIG. 8 depicts hydrodynamic size of water-soluble iron oxide nanoparticles by dynamic lighting scattering.

FIG. 8 depicts hydrodynamic (HD) size of water-soluble iron oxide nanoparticles by dynamic lighting scattering (DLS). The hydrodynamic size verifies the excellent dispersity of the iron oxide nanoparticles. The narrow and single peak reveals narrow size distribution. For core size of 9 nm water-soluble iron oxide nanoparticle, the HD size slightly increase to 11.7 nm which is relatively small comparing to nanoparticles synthesized by thermal decomposition after surface modification, that is in the range of 30-200 nm. In addition to size, compact and thin surface coating materials are of great interest to reduce hydrodynamic size for renal clearance, and to increase sensitivity of contrast agents (by enhancing the interaction of magnetic core with surrounding water). Together, the above results reveal that the iron oxide nanoparticles synthesized by disclosed methods are highly water-soluble and with no detectable aggregation.

Figure 9A:
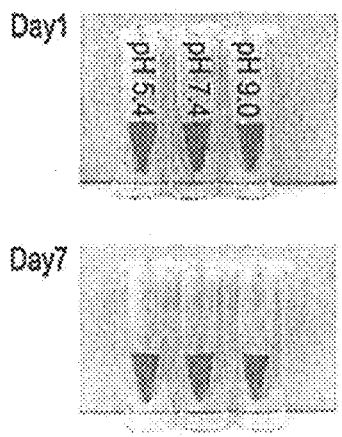
FIG. 9A depicts a photograph of water-soluble iron oxide nanoparticles.
Figure 9B:
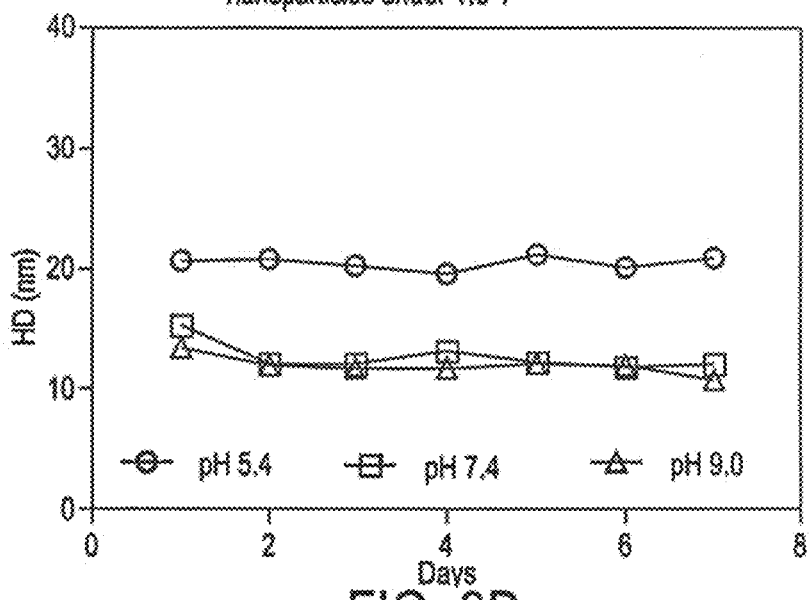
FIG. 9B depicts colloid stability and hydrodynamic (HD) size profiles of 9 nm water-soluble iron oxide nanoparticles after incubation in PBS with pHs of 5.4, 7.4, and 9.0 for a week.

Furthermore, the water-soluble iron oxide nanoparticles synthesized by the disclosed methods have outstanding colloidal stability in biological relevant solutions at different pHs. FIG. 9A depicts photograph of iron oxide nanoparticles, and FIG. 9B depicts colloid stability and hydrodynamic (HD) size profiles of 9 nm iron oxide nanoparticles after incubation in PBS with pHs of 5.4, 7.4, and 9.0 for a week. The figure shows that water-soluble iron oxide nanoparticles solutions are transparent without precipitation in acidic (pH=5.4), neutral (pH=7.4), and basic (pH=9.0) PBS after incubation of 7 days. During the procedure, the variation in hydrodynamic sizes (HD) were observed to be very small under different pHs and did not appreciably change over 7 days, as shown in FIG. 9B. The zeta potential of the water-soluble iron oxide nanoparticles in water was found to exhibit positive charges (between 30-40 mV). It may be due to non-neutralized Fe(II)/Fe(III) on the surface of water-soluble iron oxide nanoparticles. The positive charge may contribute to the high stability of water-soluble iron oxide nanoparticles in aqueous solution.

Figure 10:
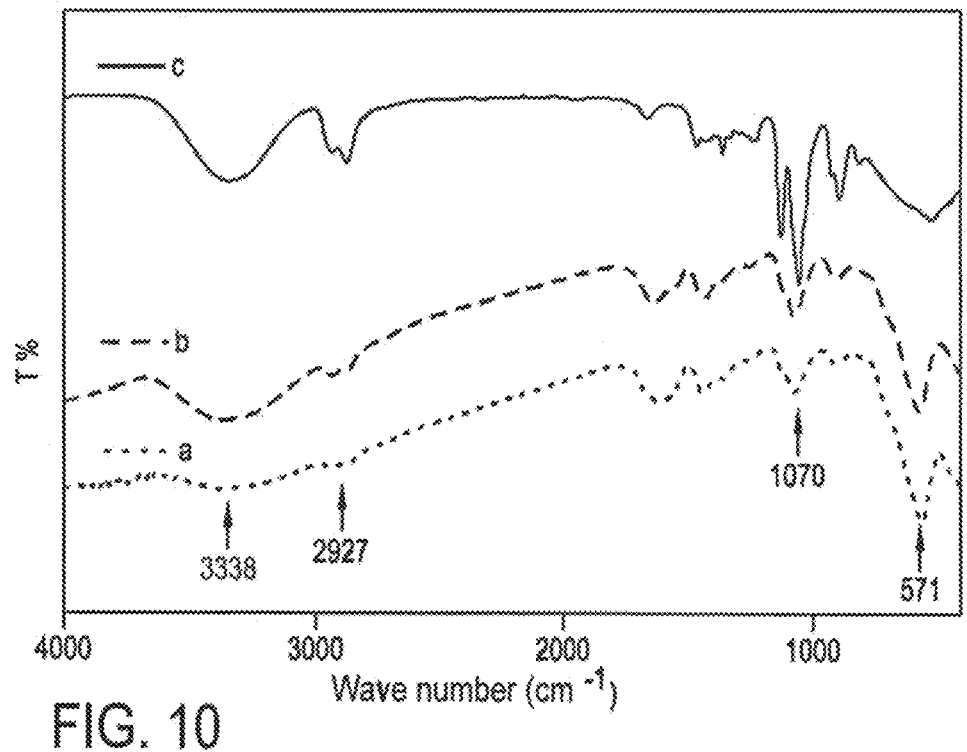
FIG. 10 depicts FT-IR spectra of water-soluble iron oxide nanoparticles with size of 9 nm (a), 4 nm (b), and pure DEG (c).

Since the disclosed methods use DEG (in plenty) as the solvent in the reaction system, it is assumed that the ligand (as shown in FIG. 1) on the surface of the water-soluble iron oxide nanoparticles is DEG. To confirm this hypothesis, Fourier-transform infrared (FT-IR) spectrum of organic layer on the water-soluble iron oxide nanoparticles was examined. FIG. 10 depicts FT-IR spectra of water-soluble iron oxide nanoparticles with size of 9 nm (a), 4 nm (b), and pure DEG (c). As illustrated in the figure, the characteristic peak of 1070 cm$^{-1}$ and 2927 cm$^{-1}$ (attributed to C—O vibration of DEG) can be clearly seen in water-soluble iron oxide nanoparticles of sizes 9 nm (a) and 4 nm (b). The broad absorption at around 3338 cm$^{-1}$ is raised from the stretching vibration of O—H from DEG and absorbed water.

Comparing to the FT-IR spectrum of pure DEG (c), the vibration of Fe—O is observed in the absorption of 571 cm$^{-1}$, which indicates that the water-soluble iron oxide nanoparticles may be magnetite (Fe$_3$O$_4$).

Figure 11:
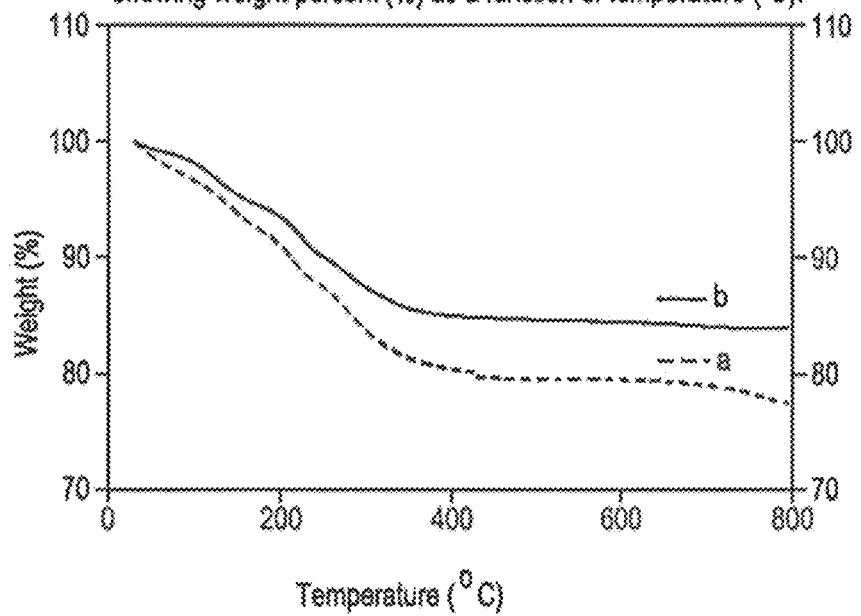
FIG. 11 depicts thermal gravimetric analysis of 4 nm (a), 9 nm (b) and (c) 13 nm water-soluble iron oxide nanoparticles, showing weight percent (%) as a function of temperature (° C.).

To study the density of DEG on the surface of water-soluble iron oxide nanoparticles, the weight of organic layer on the water-soluble iron oxide nanoparticles was measured by thermal gravimetric analysis (TGA). The TGA of water-soluble iron oxide nanoparticles with two typical sizes are shown in FIG. 11. FIG. 11 depicts TGA of water-soluble iron oxide nanoparticles having sizes: 4 nm (a), 9 nm (b) and 13 nm (c), showing weight percent (%) as a function of temperature (SC). The TGA curves show a weight loss from 30° C. to 180° C. and then from 200° C. to 400° C. The first stage at low temperature refers to the free DEG bonded to water-soluble iron oxide nanoparticles and water absorbed on the surface. The second stage at higher temperature can be assigned to decomposing of DEG bonded to water-soluble iron oxide nanoparticles via Fe—O bond. The weight loss curves are similar to the curves for water-soluble iron oxide nanoparticles with small size of 5 nm.

Table 2 shows the weight loss and DEG density for water-soluble iron oxide nanoparticles with different sample nanoparticle sizes (4 nm, 9 nm, 13 nm) from the TGA analysis. As shown in the table, weight change of about 12.7%, 9.6% and 8.4% for nanoparticles of sizes: 4 nm, 9 nm and 13 nm respectively were observed. According to the density of iron oxide and molecular weight of DEG, it was estimated that there are about 3.0, 4.9 and 5.8 DEG molecules on every nm$^2$ surface of 4 nm, 9 nm, and 13 nm nanoparticles respectively. The density of surface ligand is high compared to the coverage of PEG on gold nanoparticles which is typically around 1.6 per nm$^2$. When the size of nanoparticle is smaller, there is more DEG on the surface. A similar trend was reported in hydrophobic iron oxide nanoparticles synthesized in an organic solvent. This may be due to the reason that the surface area to volume ratio increases when the size of nanoparticles decreases.

TABLE 2

Weight loss and DEG density for water-soluble iron oxide nanoparticles with different sizes from TGA

| Sample size | Weight Change (%) | DEG on surface (per nm$^2$) |
| --- | --- | --- |
| 4 nm | 12.7 | 3.0 |
| 9 nm | 9.6 | 4.9 |
| 13 nm | 8.4 | 5.8 |
| Average | | 4.6 |

Due to the outstanding colloidal stability and high crystallinity as discussed supra, the synthesized water-soluble iron oxide nanoparticles can be used for applications such as, but not limited to, magnetic resonance imaging (MRI). The magnetic resonance (MR) phantom imaging study was conducted at a 1.5 T MRI scanner in order to evaluate the relaxivities of the iron oxide nanoparticles synthesized by the disclosed methods.

Figure 13:
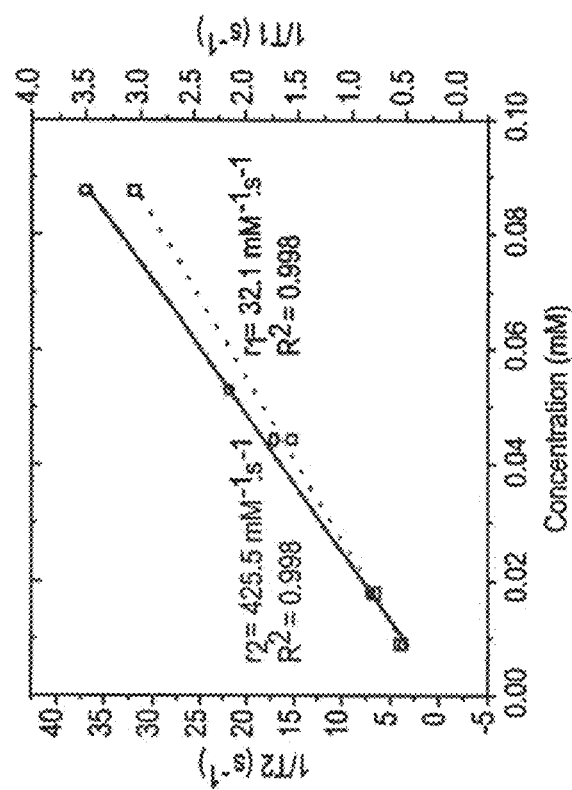
FIG. 13 depicts the inverse of the $T_2$-weighted and $T_1$-weighed relaxation times as function of water-soluble iron oxide nanoparticles under 1.5 T.
Figure 12:
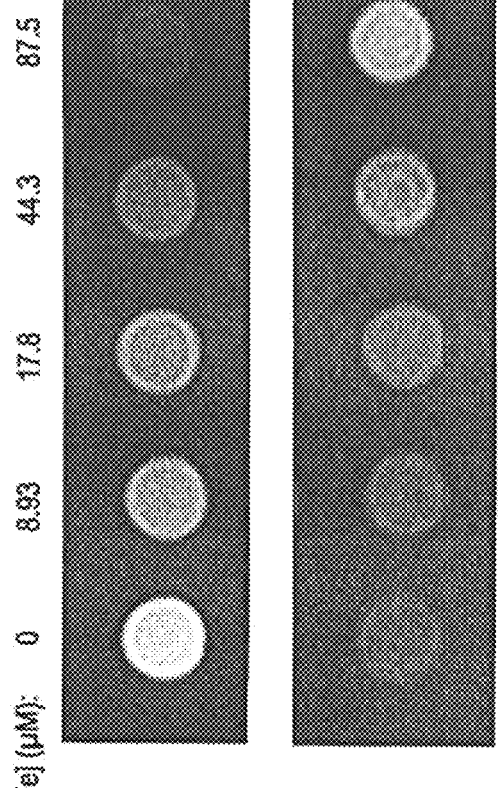
FIG. 12 depicts $T_2$-weighted and $T_1$-weighed MR phantom imaging of water-soluble iron oxide nanoparticles.

FIG. 12 depicts T$_2$-weighted and T$_1$-weighed MR phantom imaging of water-soluble iron oxide nanoparticles. FIG. 13 depicts the inverse of the T$_2$-weighted and T$_1$-weighed relaxation times as the function of water-soluble iron oxide nanoparticles under 1.5 T. The T$_2$ and T$_1$ weighed MR image of 9 nm water-soluble iron oxide nanoparticles is shown with different concentrations. As can be seen in the figure, with the increase of iron concentration, the dark signal enhancement in T$_2$ weighted MR imaging and bright signal enhancement in T$_1$ weighted MR imaging are observed. The observations indicate that these water-soluble iron oxide nanoparticles can act as both T$_1$ and T$_2$ contrast agents. By plotting the relaxation time as function of iron concentration, the transversal relaxivity (r$_2$) and longitudinal relaxivity (r$_1$) were measured as shown in (b). The r$_1$ and r$_2$ were 32 mM$^{-1}$·s$^1$ and 425 mM$^{-1}$·s$^{-1}$ respectively for 9 nm iron oxide nanoparticles. To study the size effect, the relaxivities with different sizes were estimated and have been summarized below in Table 3.

TABLE 3

Relaxivities of iron oxide nanoparticles with different sizes.

| Size (nm) | r$_2$ (mM$^{-1}$ · s$^{-1}$) | r$_1$ (mM$^{-1}$ · s$^{-1}$) | r$_2$/r$_1$ |
| --- | --- | --- | --- |
| 4 | 154.6 | 23.5 | 6.6 |
| 6 | 263.9 | 31.6 | 8.4 |
| 9 | 425.5 | 32.1 | 13.3 |

It was observed that both longitudinal and transversal relaxivities decrease with a decrease of the size, indicating that contrast effect of iron oxide nanoparticles strongly depends on size, similar to nanoparticles synthesized in organic solvent. When the size of iron oxide nanoparticles decreases to 4 nm, the r$_1$ and r$_2$ values decrease to 23 mM$^{-1}$·s$^1$ and 154 mM$^{-1}$·s$^{-1}$ respectively. With the decrease of size, it was also noticed that the transversal relaxivity decreases faster (i.e. at a faster rate) than that of longitudinal relaxivity, indicated by a decrease of r$_2$/r ratio. This trend is consistent with existing studies on size dependency of relaxivities. It is also to be noted that both r$_2$ and r$_1$ for water-soluble iron oxide nanoparticles are significantly higher than the water-soluble iron oxide nanoparticles with the similar size prepared from thermal decomposition.

The distinct r$_2$ relaxivity is probably due to high crystallinity and compact surface coating layer of water-soluble iron oxide nanoparticles prepared by the disclosed methods. Based on the findings, it is concluded that high crystallinity and smaller hydrodynamic size will result in higher r$_2$. The XRD demonstrates the high crystallinity of the synthesized water-soluble iron oxide nanoparticles which results in small dead region outside of the water-soluble iron oxide nanoparticles. Furthermore, the coating materials on the surface of the synthesized iron oxide nanoparticles are DEGs which are relatively shorter. Consequently, water in out-layer will have closer interaction with iron oxide nanoparticles. It is also to be noted that the high r$_2$ in the disclosed experiments is comparable to high r$_2$ value of the manganese doped iron oxide nanoparticles with size of about 50 nm. Therefore, it is also demonstrated that the water-soluble iron oxide nanoparticles with r$_2$ up to 425 mM$^{-1}$·s$^1$ can be obtained from relatively small size of 9 nm nanoparticles.

The disclosed methods not only provide water-soluble iron oxide nanoparticles with precise size control (nanometer-scale size increment), but also provide high water solubility without any surface modification process. Further, the water-soluble iron oxide nanoparticles synthesized by the disclosed methods exhibit high transversal relaxivity which is the highest among that synthesized by aqueous solution and organic solvents in the same size. The nanoparticles produced by the method of the present invention can potentially be used for high performance T$_1$ and T$_2$ weighted magnetic resonance imaging (MRI). Also, the size of monodisperse nanoparticles can be precisely tuned or controlled in nanometer scale as per the disclosed methods by adding reactant to the reactant mixture in a recursive manner.

Disclosed methods and their embodiments provide for continuous growth of water-soluble iron oxide nanoparticles in DEG in a manner of living growth to synthesize nanoparticles of varying sizes. The nanoparticles can keep growing in a stepwise manner at a nanometer scale in polyols by simply adding reactant to the reaction mixture. In an embodiment, the particle size of water-soluble iron oxide nanoparticles can be controlled based on the predetermined amount of reactant added. In addition, the size distribution of nanoparticles synthesized by the disclosed method is remarkably narrow and the disclosed methods are highly reproducible. The disclosed methods involve a single reactant (e.g. Fe(acac)$_3$) and there is no need for capping and reducing agents. The nanoparticles synthesized by the disclosed methods are stable in aqueous solution because amphiphilic solvent has been used for the synthesis. The aqueous solutions of iron oxide nanoparticles are stable for at least one week. The water-soluble iron oxide nanoparticles synthesized by disclosed methods exhibit remarkable high transversal ($r_2$) and longitudinal relaxivity ($r_1$) for 4/9 nm iron oxide nanoparticles which are significantly different from the nanoparticles with the same size synthesized by thermal decomposition. In addition, polyols used in the disclosed methods are regarded as green, sustainable, and biodegradable solvents which will reduce the environmental burden in comparison to traditional organic solvents. Disclosed methods also provide for scope of synthesizing water-soluble iron oxide nanoparticles with a series of sizes based on study of size dependent properties of iron oxide nanoparticles.

It may be appreciated by those skilled in the art that the above-mentioned advantage may not be restricted specifically to water-soluble iron oxide nanoparticles. The disclosed concept of continuous growth of metal oxide nanoparticles in an amphiphilic solvent (e.g. polyol) could be extended to other nanomaterials for incremental synthesis of highly water-soluble monodisperse nanoparticles.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

I claim:

1. A method for synthesizing water-soluble metal oxide nanoparticles, the method comprising:
   a. heating a first reaction mixture at a first predetermined temperature for a first predetermined time duration with continuous stirring to obtain a second reaction mixture that comprises water-soluble metal oxide nanoparticles of a first size, the first size having a standard deviation of about 10%, and the first reaction mixture comprising a reactant and a polyol, wherein the polyol is diethylene glycol (DEG);
   b. adding a first predetermined amount of the reactant to the second reaction mixture to obtain a third reaction mixture; and
   c. heating the third reaction mixture at a second predetermined temperature for a second predetermined time duration with continuous stirring to obtain a fourth reaction mixture comprising water-soluble metal oxide nanoparticles of a second size, wherein the second predetermined temperature is greater than the first predetermined temperature,
   wherein the water-soluble metal oxide nanoparticles having a size of around 9 nm exhibit a transversal relaxivity of around 425 mMol$^{-1}$.s$^{-1}$ and a longitudinal relaxivity of around 32 mMol$^{-1}$.s$^{-1}$.

2. The method as claimed in claim 1, wherein the reactant is one of iron (II) acetate (Fe(C$_2$H$_3$O$_2$)$_2$) or iron (III) acetylacetonate (Fe(acac)$_3$) and wherein the water-soluble metal oxide nanoparticles correspond to water-soluble iron oxide nanoparticles.

3. The method as claimed in claim 1 further comprising heating the first reaction mixture at an initial temperature for an initial time duration prior to the heating of the first reaction mixture at the first predetermined temperature for the first predetermined time duration.

4. The method as claimed in claim 1, wherein the first predetermined temperature is in the range of around 100° C. to 140° C. and the first predetermined time duration is in the range of around 1-3 hours.

5. The method as claimed in claim 1 further comprising:
   a. separating the water-soluble metal oxide nanoparticles from the respective reaction mixtures; and
   b. purifying the separated water-soluble metal oxide nanoparticles.

6. The method as claimed in claim 1, wherein the second predetermined temperature is in the range of around 200° C. to 240° C. and the second predetermined time duration is in the range of about 1-2 hours.

7. The method as claimed in claim 1, wherein the second size of the metal oxide nanoparticles comprised in the fourth mixture is dependent at least in part on the first predetermined amount of the reactant added to the second reaction mixture.

8. The method as claimed in claim 1, wherein the second size is greater than the first size.

9. The method as claimed in claim 1 further comprising:
 a. adding a second predetermined amount of the reactant to the fourth reaction mixture to obtain a fifth reaction mixture; and
 b. heating the fifth reaction mixture at the second predetermined temperature for the second predetermined time duration with continuous stirring to obtain a sixth reaction mixture comprising water-soluble metal oxide nanoparticles of a third size, wherein the third size is greater than the second size and the first size.

10. The method as claimed in claim 1, wherein the first size and the second size of the metal oxide nanoparticles lie in the range of about 4 nm to about 13 nm.

11. A method of continuous synthesis of water-soluble metal oxide nanoparticles of varying sizes, the method comprising:
 a. performing a first heating operation on a reaction mixture at an initial temperature of about 100° C. to about 140° C. for an initial time duration of about 1 hour to about 3 hours, the reaction mixture comprising a first predetermined amount of a reactant and a polyol, wherein the polyol is diethylene glycol (DEG);
 b. performing a second heating operation, on the reaction mixture obtained from the first heating operation, at a predetermined temperature for a predetermined time duration to obtain water-soluble metal oxide nanoparticles of a selected first size, wherein the first predetermined amount of the reactant added during the first heating operation is determined by the selected first size, wherein the predetermined temperature is greater than the initial temperature;
 c. adding a second predetermined amount of the reactant to the reaction mixture obtained from the second heating operation; and
 d. performing a third heating operation, on the reaction mixture obtained from adding the second predetermined amount of the reactant, at the predetermined temperature for the predetermined time duration to obtain water-soluble metal oxide nanoparticles of a selected second size, wherein the second predetermined amount of the reactant added is determined by the selected second size,
 wherein the water-soluble metal oxide nanoparticles having a size of around 9 nm exhibit a transversal relaxivity of around 425 mMol$^{-1}$.s$^{-1}$ and a longitudinal relaxivity of around 32 mMol$^{-1}$.s$^{-1}$.

12. The method as claimed in claim 11, wherein the reactant is Fe(acac)$_3$.

13. The method as claimed in claim 11, wherein the predetermined temperature is in the range of around 200° C. to 240° C. and the predetermined time duration is in the range of about 1-2 hours.

14. The method as claimed in claim 11, wherein the second size of the metal oxide nanoparticles is dependent at least in part on the second predetermined amount of the reactant added to the reaction mixture.

15. A method of synthesizing water-soluble metal oxide nanoparticles having incremental particle sizes, the method comprising:
 a. performing a preliminary heating operation on a reaction mixture at an initial temperature in a range of about 100° C. to about 140° C. for an initial time duration prior to performing any heating operation, wherein the initial temperature is less than a predetermined temperature;
 b. performing a heating operation on the reaction mixture at the predetermined temperature in a range of about 200° C. to about 240° C. for a predetermined time duration to obtain water-soluble metal oxide nanoparticles of a first size, the reaction mixture comprising a reactant and a polyol, wherein the polyol is diethylene glycol (DEG); and
 c. performing recursively an addition operation of a predetermined amount of the reactant to the reaction mixture obtained from a previous heating operation and a heating operation on the reaction mixture, obtained from the addition operation, at the predetermined temperature for the predetermined time duration to obtain water-soluble metal oxide nanoparticles,
 wherein the particle size of water-soluble metal oxide nanoparticles obtained from every heating operation is greater than the particle size of water-soluble metal oxide nanoparticles obtained from a previous heating operation and wherein the water-soluble metal oxide nanoparticles having a size of around 9 nm exhibit a transversal relaxivity of around 425 mMol$^{-1}$.s$^{-1}$ and a longitudinal relaxivity of around 32 mMol$^{-1}$.s$^{-1}$.

16. The method as claimed in claim 15, wherein the recursive addition operation and heating operation are performed up to 6 times or less to obtain water-soluble metal oxide nanoparticles having particle sizes in the range of about 4 nm to about 13 nm.

17. The method as claimed in claim 15, wherein the decomposition temperature of the reactant is lower than the boiling point of the polyol.

18. The method as claimed in claim 15, wherein the reactant is Fe(acac)$_3$.

19. The method as claimed in claim 18, wherein the water-soluble metal oxide nanoparticles correspond to water-soluble iron oxide nanoparticles.

20. The method as claimed in claim 15, wherein the reactant is selected from a group consisting of Mn(acac)$_2$, Ni(acac)$_2$, Co(acac)$_2$ and Fe(C$_2$H$_3$O$_2$)$_2$.

\* \* \* \* \*